(12) United States Patent
Burk et al.

(10) Patent No.: US 6,662,864 B2
(45) Date of Patent: Dec. 16, 2003

(54) AIR-CONDITIONING SYSTEM WITH AIR-CONDITIONING AND HEAT-PUMP MODE

(75) Inventors: Roland Burk, Stuttgart (DE);
Hans-Joachim Krauss, Stuttgart (DE);
Christoph Walter, Stuttgart (DE);
Marcus Weinbrenner, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/880,768

(22) Filed: Jun. 15, 2001

(65) Prior Publication Data

US 2001/0052238 A1 Dec. 20, 2001

(30) Foreign Application Priority Data

Jun. 17, 2000 (DE) .......................... 100 29 934

(51) Int. Cl.[7] .......................... F25B 29/00; B60H 1/00; B60H 1/82
(52) U.S. Cl. .......................... 165/202; 165/42; 165/43; 165/240; 62/434; 62/435; 62/244; 62/238.6; 62/196.4; 62/323.1; 237/2 B
(58) Field of Search .......................... 165/202, 42, 43, 165/240; 237/2 B; 62/238.6, 238.7, 434, 435, 244, 196.4, 323.1

(56) References Cited

U.S. PATENT DOCUMENTS

| | | | |
|---|---|---|---|
| 5,265,437 A | * 11/1993 | Saperstein et al. | ............ 62/435 |
| 5,483,807 A | * 1/1996 | Abersfelder et al. | ........... 62/435 |
| 5,725,048 A | 3/1998 | Burk et al. | |
| 5,749,235 A | * 5/1998 | Ueda | ............................ 62/435 |
| 5,904,052 A | * 5/1999 | Inoue et al. | ................... 62/434 |
| 6,038,877 A | * 3/2000 | Peiffer et al. | .................. 62/435 |
| 6,092,383 A | * 7/2000 | Mertens | ..................... 62/323.1 |

FOREIGN PATENT DOCUMENTS

| | | |
|---|---|---|
| DE | 42 06 611 A1 | 9/1992 |
| DE | 43 41 756 | 6/1995 |
| DE | 196 29 114 A1 | 1/1998 |
| DE | 198 13 674 | 4/1999 |
| DE | 198 06 654 A1 | 8/1999 |
| JP | 09-169207 | * 6/1997 |
| JP | 11-301254 | * 2/1999 |

* cited by examiner

*Primary Examiner*—John K. Ford
(74) *Attorney, Agent, or Firm*—Foley & Lardner

(57) ABSTRACT

An air-conditioning system is designed at least for an air-conditioning mode for cooling a thermal control medium (13) and a heat-pump mode for heating the thermal control medium. The system comprises a refrigerant circuit with a compressor (1) and an evaporator (8), a coolant circuit with a heat-generating unit (10) to be cooled and a heater (12) for heating the thermal control medium, and also a first refrigerant/coolant heat exchanger (3) functioning on the refrigerant side as a condenser/gas cooler. The evaporator is formed by a second refrigerant/coolant heat exchanger (8). A cooling body (14) for cooling the thermal control medium is connected downstream of heat exchanger (8) on the coolant side.

11 Claims, 3 Drawing Sheets

AIR-CONDITIONING SYSTEM WITH AIR-CONDITIONING AND HEAT-PUMP MODE

BACKGROUND OF THE INVENTION

The present invention relates to an air-conditioning system which is designed at least for an air-conditioning mode for cooling a thermal control medium and a heat-pump mode for heating the thermal control medium. For this purpose, the system comprises a refrigerant circuit with a compressor and an evaporator, a coolant circuit with a heat-generating unit to be cooled and with a heater for heating the thermal control medium. The system also includes a refrigerant/coolant heat exchanger which functions on the refrigerant side as a condenser or gas cooler, depending on the refrigerant used.

Air-conditioning systems of this type are employed, for example, for motor vehicles. The heat-generating unit to be cooled is conventionally an internal combustion engine used for driving the motor vehicle. An air-conditioning system of this type for a motor vehicle disclosed in DE 43 41 756 A1 contains, in addition to the condenser formed by the refrigerant/coolant heat exchanger, a further condenser which is arranged parallel to the first condenser and is designed as a refrigerant/ambient-air heat exchanger, i.e., as a refrigerant cooler. In it the refrigerant is cooled not by the coolant and not by the thermal control medium, but by ambient air. Also provided in the coolant circuit is a coolant cooler, by means of which the coolant can be cooled by ambient air. By means of various valves and bypass lines, the refrigerant can be conducted selectively through one condenser or the other. The coolant can be selectively conducted through the heater or it can bypass the heater, or it can be selectively conducted through the coolant cooler or bypass it and be conducted through the associated condenser or bypass it, or passed through it in a circulating manner. The purpose of the recirculation is to increase the contribution to the heating of the coolant in an initial operating phase of the refrigerant circuit. This is accomplished by first having only a little coolant flowing through the respective condenser, so that the coolant temperature in the condenser and therefore also the condensation temperature rise rapidly. Air to be conditioned and to be supplied to a vehicle interior can be cooled by the evaporator and heated by the heater.

Particularly in the case of so-called low-consumption vehicles, there is generally the problem that internal combustion engines with optimized consumption, for example, diesel engines with direct injection, no longer generate sufficient waste heat to heat the vehicle interior to a comfortable temperature level within a reasonable time, especially during low-load operation, for example, under city driving conditions. Even sufficient deicing of the front and side windows is often no longer guaranteed by engine waste heat alone. Another problem detrimental to air-conditioning comfort is the increasingly employed automatic start/stop devices, whereby the internal combustion engine of the motor vehicle is stopped during brief halts at traffic lights or in a traffic jam. The secondary assemblies, including the air-conditioning system compressor, also are deactivated as a result.

To cover the heating power deficit occurring for these reasons, a multiplicity of supplemental heating concepts employing a heat-pump have already been proposed, usually in the form of combined controls for refrigerant, coolant and air circuits. In a known concept, such as is disclosed, for example, in DE 198 06 654 A1, a supply-air/refrigerant heat exchanger functions as an evaporator in the air-conditioning mode to cool the supply air to the vehicle interior, and as a condenser or gas cooler in the heat-pump mode to heat the supply air. A similar concept with the selective use of a supply-air/refrigerant heat exchanger as an evaporator or condenser/gas cooler is disclosed in DE 198 13 674 C1. These known concepts require a bidirectionally operating expansion valve.

The known air-conditioning systems, in which a thermal-control medium/refrigerant heat exchanger functions as an evaporator in the air-conditioning mode and optionally as a condenser/gas cooler in the heat-pump mode, are generally faced with the problem of fogging when used in vehicles. Fogging occurs predominantly in the transitional seasons in the case of moist and cold climatic conditions. The condensed water precipitated in a reheating (drying mode) on the supply-air/refrigerant heat exchanger functioning as an evaporator is absorbed by the supply-air stream when subsequent heating operation is activated in the heat-pump mode. This is particularly the case when the supply-air/refrigerant heat exchanger functions in this operating mode as a condenser/gas cooler and the condensation water adhering to it evaporates into the supply-air stream. In this situation, it may lead to fogging of the vehicle window onto which the supply-air stream flows.

The known air-conditioning system concepts (involving the direct release of condensation heat or hot-gas heat in a supply-air/refrigerant heat exchanger functioning as an evaporator in the air-conditioning mode) also present a problem during the heat-pump mode. A large temperature gradient may be formed over the supply-air side outlet surface of this heat exchanger and cause significant temperature differences at various air outlet nozzles, to which the supply-air stream is apportioned in order to be fed into various vehicle interior regions.

SUMMARY OF THE INVENTION

One object of the present invention is to provide an improved air-conditioning system of the type initially mentioned, which by relatively simple means allows effective air-conditioning operation, on the one hand, and heat-pump operation, on the other hand.

A particular object is to provide such a system that avoids overhumidifying the thermal control medium during a changeover from the air-conditioning mode or a reheating mode to the heat-pump mode, as well as the disturbing fogging resulting therefrom in vehicle applications.

Another object is to provide an air-conditioning system with the capacity for comfortable heating of the supply air in vehicle applications in the heat-pump mode, without pronounced temperature differences at various air outlet nozzles.

Still another object of the invention is to provide a motor vehicle having an improved air-conditioning system.

It is also an object of the invention to provide an improved method of conditioning air that is supplied to the passenger compartment of a motor vehicle.

In accomplishing these and other objects, there has been provided in accordance with one aspect of the present invention an air-conditioning system which is suitable for a motor vehicle and which is capable of operating at least in an air-conditioning mode for cooling a thermal control medium, preferably air, and in a heat-pump mode for heating the thermal control medium. The system comprises a refrigerant circuit comprising a compressor and an evaporator, wherein the evaporator includes a second refrigerant/coolant heat exchanger; a coolant circuit comprising a heat-generating unit to be cooled and a heater for heating the thermal control medium; a first refrigerant/coolant heat exchanger functioning on the refrigerant side as a condenser/gas cooler; and a cooler downstream of the evaporator on the coolant side for selectively cooling the thermal control medium.

According to another aspect of the invention, there has been provided a motor vehicle having an improved air-conditioning system of the type described above.

According to still another aspect of the invention there has been provided a method for air-conditioning supply air for a passenger compartment in a motor vehicle that includes a refrigerant circuit comprising a compressor and an evaporator, wherein the evaporator comprises a second refrigerant/coolant heat exchanger, a coolant circuit comprising a heat-generating unit to be cooled and a heater for heating the thermal control medium, a first refrigerant/coolant heat exchanger functioning on the refrigerant side as a condenser/gas cooler, and a cooler downstream of the evaporator on the coolant side for selectively cooling the thermal control medium. The method comprises: selectively passing supply air through a cooler supplied with coolant that is cooled by the second refrigerant/coolant heat exchanger; and/or passing supply air downstream of the cooler through a heater supplied with coolant that is selectively heated in part by the first refrigerant/coolant heat exchanger.

Further objects features and advantages of the present invention will become apparent from the detailed description of preferred embodiments that follows, when considered together with the accompanying figures of drawings.

DETAILED DESCRIPTION OF PREFERRED EMBODIMENTS

Figure 1:
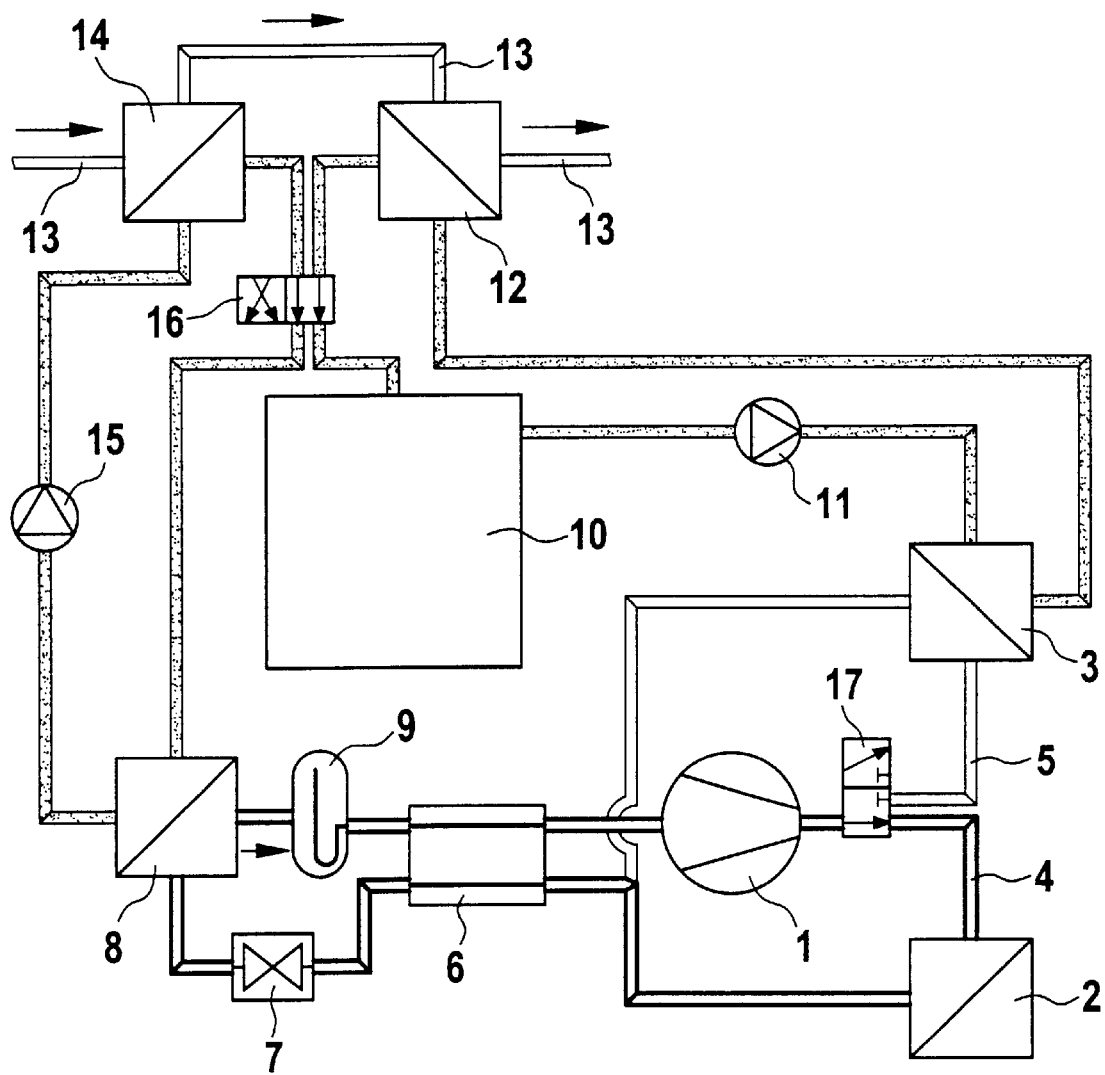
FIG. 1 is a block diagram showing a motor vehicle air-conditioning system according to the invention in the air-conditioning mode.

The invention provides an air-conditioning system having an evaporator that includes a second refrigerant/coolant heat exchanger rather than a refrigerant/thermal-control medium heat exchanger. The evaporator is followed on the coolant side by a cooling body for cooling the thermal control medium.

Disturbing overhumidification of the thermal control medium during the changeover to the heat-pump mode is avoided by providing that the transmission of heat to the supply-air stream takes place through the heating body and the cooling of the supply-air stream takes place through the cooling body. The supply-air thermal control quality expected of conventional systems is preserved. The thermal control medium can be heated or cooled in the desired way in each case by means of the heater, on the hand, and the cooling body, on the other hand. In the heat-pump mode, the power of the heater is not restricted to the discharge of heat of the unit to be cooled, but can additionally be assisted by the heat-pump effect of the refrigerant circuit, in that the forward-flow temperature of the heater is raised by means of the condenser/gas cooler through which coolant flows.

Another advantage of not cooling the thermal control medium directly at the evaporator, but at a cooling body following the evaporator, is that the thermal control medium can be led, without pronounced temperature differences, over the outlet surface of the cooling body and/or of the heater. This avoids the situation, in vehicle applications, where there are significant temperature differences of the supply air blown out into the vehicle interior at various air outlet nozzles.

A preferred air-conditioning system developed according to the invention contains a refrigerant cooler as a further condenser/gas cooler which is connected in parallel with the refrigerant/coolant heat exchanger on the refrigerant side. In the refrigerant cooler, the refrigerant is cooled by a third medium, for example, an ambient-air stream. By means of appropriate flow control means, the refrigerant can be guided selectively entirely via the one condenser/gas cooler, entirely via the other condenser/gas cooler or with controllable fractions via both of these. As a result, in the air-conditioning mode, heat can be discharged via the refrigerant and the condenser/gas cooler formed by the refrigerant cooler and, in the heat-pump mode and reheating mode, heat can be transmitted from the refrigerant circuit via the other condenser/gas cooler to the coolant heater.

An air-conditioning system developed according to another preferred embodiment contains improved coolant flow control means. With the aid of these the coolant emerging from the heater can be led selectively to the evaporator and/or to the heat-generating unit, and the coolant emerging from the cooling body can be led selectively to the heat-generating unit and/or to the evaporator. This makes it possible, in the air-conditioning mode and in the reheating mode, to divide the coolant circuit into two subcircuits that remain separated. In this embodiment the evaporator and the cooling body form one subcircuit, and the heat-generating unit, the refrigerant/coolant heat exchanger (functioning as a condenser/gas cooler) and the heater form the other subcircuit. This division can be cancelled in the heat-pump mode, in order to return coolant residual heat not discharged in the heater into the refrigerant circuit again via the evaporator and thereby recover this residual heat.

One preferred embodiment of the invention is illustrated in the drawings and is described below.

Figure 2:
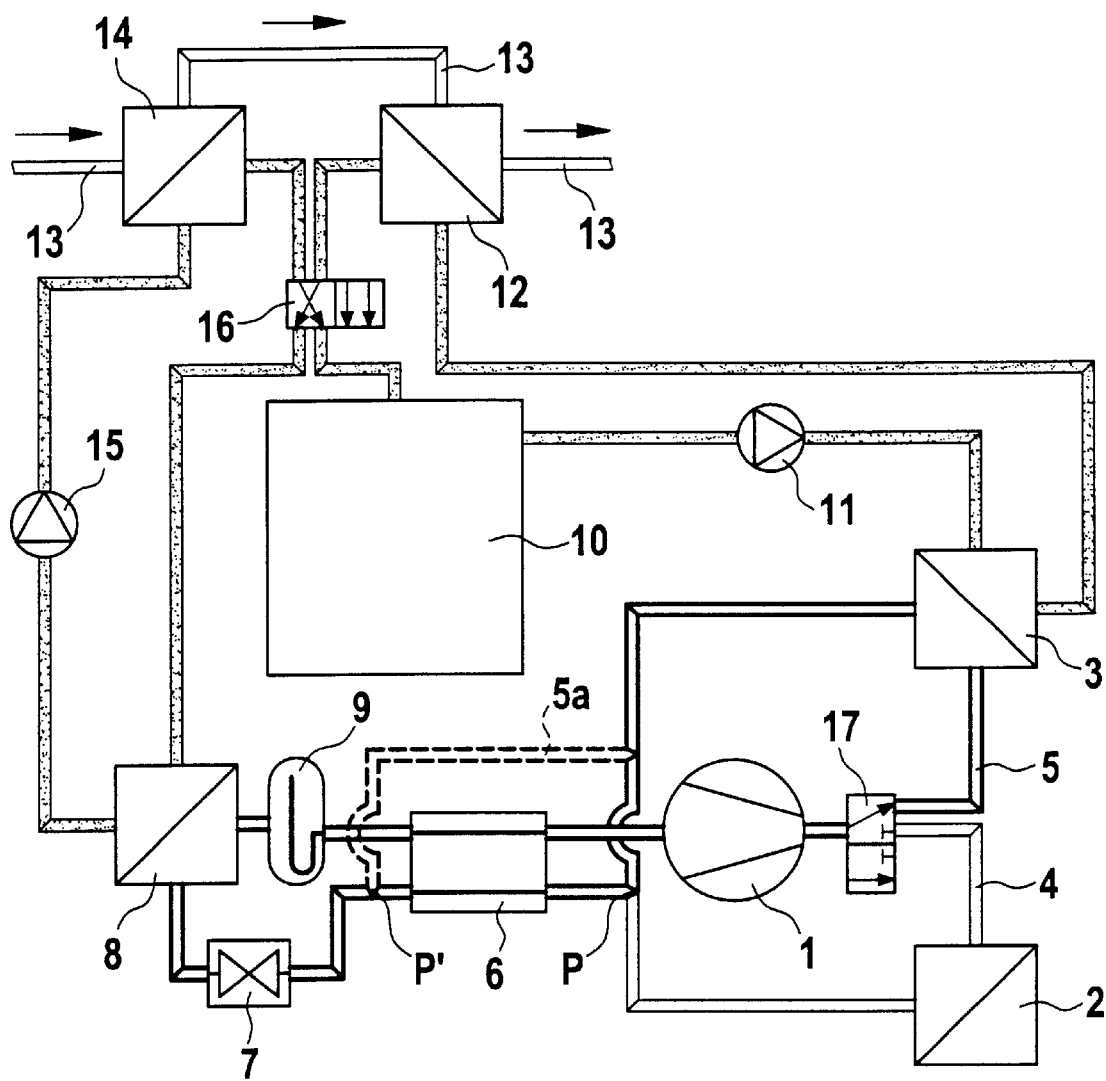
FIG. 2 is a block diagram of the air-conditioning system of FIG. 1 in the heat-pump mode.
Figure 3:
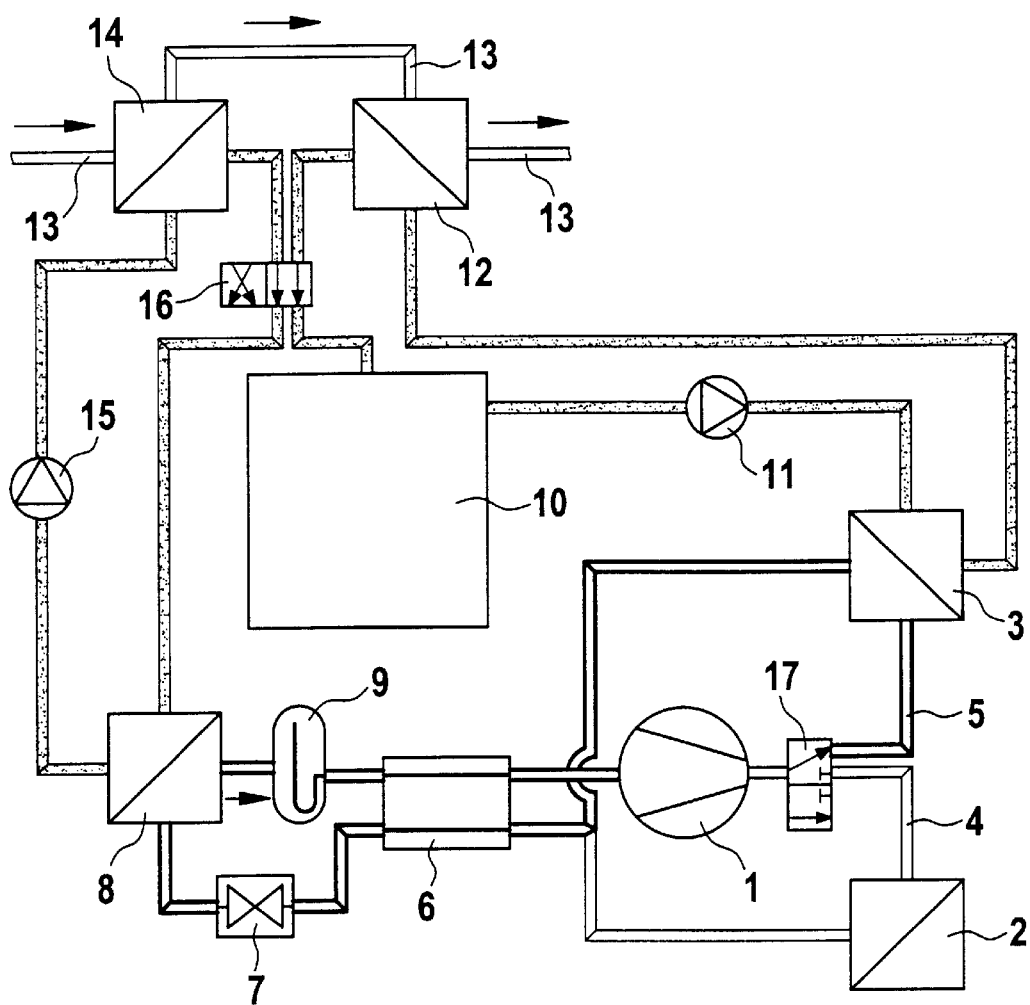
FIG. 3 is a block diagram of the air-conditioning system of FIG. 1 in the reheating mode.

The motor vehicle air-conditioning system illustrated in FIGS. 1 to 3 contains a refrigerant circuit with a compressor 1 followed on the refrigerant high-pressure side by two parallel condensers or gas coolers 2, 3, each in their own line branch 4, 5. These line branches are combined again upstream of an expansion member 7. The latter is followed on the low-pressure side by an evaporator 8 and a header 9, out of which the compressor 1 draws low-pressure side refrigerant. An inner heat exchanger 6 is optionally provided, in which the low-pressure side refrigerant drawn out of the header 9 can be brought into thermal contact with the high-pressure side refrigerant. In a first implementation, in this case, the two high-pressure side line branches 4, 5 are combined, upstream of the inner heat exchanger 6, at a point P. Since the inner heat exchanger 6 does not afford any advantages in the heat-pump mode, there may be provision, in an alternative embodiment, for the two high-pressure side line branches 4, 5 to be combined downstream of the inner heat exchanger 6, at a point P', as indicated in FIG. 2. In this embodiment, only the line branch 4 active in the air-conditioning operation is led through the inner heat exchanger 6, while the other line branch 5 active in the heat-pump mode bypasses the inner heat exchanger 6, as illustrated in FIG. 2 by dashed line segment 5a.

The air-conditioning system also contains a coolant circuit, in which a motor vehicle internal combustion engine 10, functioning as a drive engine, represents a waste-heat-generating unit. The coolant used, for example, cooling water or a cooling brine, passes from the engine via a first coolant pump 11, to the coolant side of one condenser/gas cooler 3 which is designed as a refrigerant/coolant heat exchanger. The coolant side of this condenser/gas cooler 3 is followed by a heater 12 which is designed as a supply-air/coolant heat exchanger and accordingly serves for heating a supply-air stream 13 which (at least in part) is drawn in from outside in the conventional way (not shown in any more detail) and introduced into the vehicle interior.

The heater 12 is preceded on the supply-air side by a cooling body 14 which is likewise designed as a supply-air/coolant heat exchanger. On the coolant side, the inlet of this cooling body 14 is connected to the coolant outlet side of the evaporator 8, which is designed as a refrigerant/coolant heat exchanger and not, as is customary in vehicle air-conditioning systems, as a refrigerant/supply-air heat exchanger. In this case, a second coolant pump 15 is located in the coolant connecting line from the evaporator 8 to the cooling body 14. The cooling body 14 and the heater 12 are arranged in an air-guiding housing of the vehicle air-conditioning system in the conventional manner for such heat exchangers, and therefore the structure is not shown in any more detail here.

As preferably the sole flow control means, the coolant circuit contains a 4/2-way valve 16. By means of this valve, the coolant emerging from the cooling body 14 can be supplied selectively to the evaporator 8, and the coolant emerging from the heater 12 can be supplied selectively to the internal combustion engine 10, or the coolant emerging from the cooling body 14 can be supplied selectively to the internal combustion engine 10, and the coolant emerging from the heater 12 can be supplied selectively to the evaporator 8. In the former case, the coolant circuit is subdivided into two separate subcircuits, of which one comprises the evaporator 8 and the cooling body 14, whereas the other subcircuit comprises the internal combustion engine 10, the associated condenser/gas cooler 3 and the heater 12.

Furthermore, the refrigerant circuit preferably contains a 3/2-way valve 17 as the sole flow control means. By means of this valve the refrigerant emerging from the compressor 1 can be supplied selectively to one condenser/gas cooler 2 or the other condenser/gas cooler 3.

The air-conditioning system constructed as described above allows both air-conditioning operation for cooling the supply air 13 and heat-pump operation for heating the supply air as quickly and as effectively as possible, even when relatively little waste heat from the internal combustion engine occurs. It also allows a reheating operation for drying the supply air 13.

FIG. 1 shows the air-conditioning system with the air-conditioning operation activated. In this case, the refrigerant flow is marked by a thicker line. Accordingly, the refrigerant discharged from the compressor 1 is supplied to the refrigerant cooler 2 by means of a corresponding control of the associated valve 17, while the other condenser/gas cooler 3, designed as a refrigerant/coolant heat exchanger, remains inactive. The high-pressure side refrigerant is condensed by ambient air or at least cooled in the refrigerant cooler 2, it discharges heat to the low-pressure side refrigerant in the optional inner heat exchanger 6, and it is then expanded into the evaporator 8 by the expansion member 7. It passes from there to the compressor 1 again via the header 9 and the optional inner heat exchanger 6.

The evaporator 8 thereby cools the coolant which is supplied to it. The coolant then, in turn, in the following cooling body 14, cools in the desired way the supply air 13 which is to be supplied to the vehicle interior. The coolant flows from the cooling body 14 to the evaporator 8 again as a result of a corresponding control of the coolant valve 16. That part of the coolant circuit which is separated from the subcircuit having the evaporator 8 and the cooling body 14 in this operating mode remains inactive in terms of the thermal control of the supply air. Thus, in so-called air-conditioning systems regulated on the water side, the coolant stream is shut down by means of a valve (which is not shown). In the case of so-called air-conditioning systems regulated on the air side, hot coolant can continue to flow through the heater 12, in which case provision is normally made to bypass at least a portion of the supply-air stream 13 cooled at the cooling body 14 around the heater 12 via a corresponding bypass duct. This separated part of the coolant circuit thus corresponds to a conventional heating circuit as a subcircuit of the cooling system for the internal combustion engine 10.

FIG. 2 shows the air-conditioning system in the heat-pump mode, which serves for making it possible to heat the supply air 13 sufficiently even when this is not ensured by the waste heat from the internal combustion engine alone. In this operating mode, as symbolized again by a thicker line, the high-pressure refrigerant is conducted by a corresponding setting of the associated valve 17 from the compressor 1 to the coolant-side condenser/gas cooler 3, and from there to the combination point P upstream of the inner heat exchanger 6. In the variant in which the high-pressure side line branch 5 (active in the heat-pump mode) is combined with the other high-pressure side line branch 4 only downstream of the inner heat exchanger 6 at the point P', the high-pressure side refrigerant passes from the coolant-side condenser/gas cooler 3 directly to the expansion member 7. As in the operating state shown in FIG. 1, the refrigerant passes from the expansion member 7 to the evaporator 8 and from there to the compressor 1 again via the header 9 and the inner heat exchanger 6. The coolant-side condenser/gas cooler 3 active in this operating state introduces heat into the coolant circuit, in addition to the waste heat possibly present from the internal combustion engine 10. This is done directly upstream of the heater 12 in which the coolant thus heated up heats the supply air 13 in the desired way. In order to reach a high temperature level as quickly as possible in the start-up state, a relatively low coolant mass flows through the associated condenser/gas cooler 3, and the heater 12 is expedient in the starting phase. As a result, for example when $CO_2$ is used as refrigerant, a high pressure ratio is generated relatively quickly, so that the compressor 1 can introduce additional heat capacity into the coolant circuit very effectively and quickly.

By an appropriate setting of the coolant valve 16, the coolant emerging from the heater 12 is guided directly to the evaporator 8, in which it supplies the heat introduced previously from the refrigerant circuit to the latter again, insofar as this heat has not been utilized in the heater 12 for heating up the supply air. Thus, the coolant residual heat not capable of being transmitted by the heater 12 as a result of the lower temperature level is pumped to the higher temperature of the coolant forward flow as a result of the heat-pump effect of the refrigerant circuit. The coolant emerging from the evaporator 8 is led via the cooling body 14 and from there, by an appropriate setting of the coolant valve 16, to the internal combustion engine 10 again. Should undesirable cooling of intaken supply air 13 occur at the cooling body 14, depending on the temperature of the outside air, this can be avoided, for example, by causing the supply air 13 in this operating state to bypass the cooling body 14 via an associated bypass duct.

FIG. 3 shows the air-conditioning system in reheating operation. In this case, the refrigerant flow ducting corresponds to that in the heat-pump mode of FIG. 2, while the coolant flow ducting corresponds to that of the air-conditioning mode of FIG. 1. This is made evident from the positions of the refrigerant valve 17 and of the coolant valve 16 which are shown. Consequently, as in the heat-pump mode, the coolant coming from the internal combustion engine 10 is further heated up in the associated condenser/gas cooler 3 before it enters the heater 12. From there, however, it is returned directly to the internal combustion engine 10. The coolant valve 16 separates the low-temperature circuit of the coolant having the evaporator 8 and the cooling body 14 from this high-temperature circuit, so that the intaken supply air 13 can be effectively cooled below its dew point temperature at the cooling body 14 as a result of the effect of the evaporator 8 and can thereby be dried. The heater 12 which follows on the air side then again ensures that the supply air 13 is heated sufficiently.

It goes without saying that the air-conditioning system according to the invention may comprise further components in addition to the components shown, depending on the applications. The two condensers/gas coolers may be produced as separate structural units or may be integrated into a common structural unit. It is also possible to use only the condenser/gas cooler coupled on the coolant side and to dispense with the refrigerant cooler, in which case care must be taken in a suitable way to ensure that, in the air-conditioning mode, heat introduced from this condenser/gas cooler into the coolant circuit is suitably discharged again there, for example, via a coolant cooler, without causing the supply air to be heated up undesirably. All customary refrigerants and coolants may be used. The high-pressure side heat exchanger or heat exchangers function as a condenser or gas cooler, depending on the refrigerant. In particular, it is possible without difficulty to use safety-critical refrigerants for vehicle applications, since all the components of the refrigerant circuit can be kept outside the supply-air side system part and therefore outside the vehicle interior.

As a further variant of the air-conditioning system shown, refrigerant may be supplied, by means of a correspondingly modified refrigerant valve, in controllable fractions both to one condenser/gas cooler 2, 3 and the other. In addition or alternatively, the coolant coming from the heater 12, and the coolant coming from the cooling body 14 can be supplied, by means of a correspondingly modified coolant valve, in controllable fractions in each case both to the heat-generating unit 10 and to the evaporator 8.

The air-conditioning system according to the invention has a series of advantages. Thus, it makes it possible to have a higher additional capacity as a heating-up system with PTC heating or fuel heating. Also, since the discharge of heat from the thermal control medium in the air-conditioning mode and in the reheating mode, on the one hand, and the supply of heat to the thermal control medium in the heat-pump mode, on the other hand, take place in different heat exchangers, and since the evaporator is not loaded by the thermal control medium, overhumidification of the thermal control medium can be reliably avoided. In vehicle applications, the result is that the supply air to be thermally controlled does not cause any fogging of vehicle windows, even under adverse conditions. It is possible, furthermore, to avoid the temperature gradients of the thermal control medium stream which occur in conventional systems, in which the thermal control medium is thermally controlled at a heat exchanger functioning selectively as an evaporator and as a condenser/gas cooler.

In order to implement the air-conditioning system starting from basic conventional systems, only a relatively low additional outlay in terms of apparatus is needed, in the form of a refrigerant-side and a coolant-side multi-way valve and a second refrigerant/coolant heat exchanger. The coolant-side valve is subjected to only slight load and therefore is capable of being produced cost-effectively. A net heat extraction from the coolant circuit, which would lead to a prolongation of the engine warm-up phase, is avoided, in that the extracted heat is increasingly supplied to the coolant again at a higher temperature level as a result of the compressor drive power. This also has a positive effect on the warm-up behavior of the engine.

Furthermore, the air-conditioning system according to the invention forms an ideal basis for the optimization and further development of integral thermal management systems for low-consumption vehicles, such as with regard to short-term cold storage for bridging temporary engine stop phases and the utilization of brake energy via an externally activatable compressor. Moreover, thermal control of surrounding surfaces by the transport of heat via the coolant can be implemented, using decentralized air-conditioning components or surface heat exchangers.

The disclosure of German Patent Application No. 100 29 934.2, filed Jun. 17, 2000, is hereby incorporated by reference in its entirety.

The foregoing embodiments have been shown and described for illustrative purposes only and are not intended to limit the scope of the invention which is defined by the claims. The invention includes all obvious modifications of the embodiments described above.

What is claimed is:

1. An air-conditioning system which is suitable for a motor vehicle and which is capable of operating at least in an air-conditioning mode for cooling a thermal control medium and in a heat-pump mode for heating the thermal control medium, comprising:

a coolant circuit comprising a heat-generating unit to be cooled and a heater for heating the thermal control medium;

a refrigerant circuit comprising a compressor and an evaporator, wherein the evaporator comprises a first refrigerant/coolant heat exchanger that interrelates the coolant circuit and the refrigeration circuit;

a first refrigerant cooler comprising a second refrigerant/coolant heat exchanger interrelating said refrigerant circuit and said coolant circuit and functioning on the refrigerant side as a condenser/gas cooler;

a cooler in said coolant circuit downstream of the evaporator for selectively cooling the thermal control medium on its coolant side, and a coolant flow controller means for selectively performing each of the functions of (a) transferring coolant from the heater directly to the evaporator while simultaneously transferring the coolant from the cooler to the heat-generating unit, and (b) transferring coolant from the heater to the heat generating unit while simultaneously transferring coolant from the cooler to the evaporator.

2. An air-conditioning system as claimed in claim 1, further comprising:

a second refrigerant cooler comprising a condenser/gas cooler, said second refrigerant cooler being connected in parallel with the first refrigerant cooler, and a refrigerant flow controller for selectively supplying refrigerant to at least one of the refrigerant coolers.

3. An air-conditioning system as claimed in claim 1, wherein the coolant flow controller means comprises a single controller unit.

4. An air-conditioning system as claimed in claim 3, wherein the controller unit comprises a 4/2-way valve.

5. An air-conditioning system as claimed in claim 3, wherein the controller unit comprises the sole flow control element in the coolant circuit.

6. An air-conditioning system as claimed in claim 1, wherein the refrigerant flow controller comprises a 3/2-way valve.

7. An air-conditioning system as claimed in claim 6, wherein the 3/2-way valve comprises the sole flow control means in the refrigerant circuit.

8. In a vehicle comprising a passenger compartment and an engine constituting said heat-generating unit, an air-conditioning system as defined by claim 1.

9. A method for air-conditioning a thermal control medium comprising supply air for a passenger compartment in a motor constituting a heat generating unit vehicle that includes a motor and an air-conditioning system as defined by claim 1, the method comprising:

selectively passing supply air constituting said thermal control medium through the cooler supplied with coolant that is cooled by the first refrigerant/coolant heat exchanger; and/or passing supply air constituting said thermal control medium downstream of the cooler through the heater supplied with coolant that is selectively heated in part by the second refrigerant/coolant heat exchanger, wherein the method further comprises a heating mode comprising selectively supplying refrigerant to said first refrigerant cooler and selectively returning coolant from the heater directly to the evaporator and from the cooler to the motor.

10. A method as claimed in claim 9, wherein the method further comprises a reheating mode comprising selectively supplying refrigerant to said first refrigerant cooler and selectively returning coolant from the heater to the motor and from the cooler to the evaporator.

11. A method as claimed in claim 9, wherein the system further includes a second refrigerant cooler comprising a condenser/gas cooler, said second refrigerant cooler being connected in parallel with the first refrigerant cooler, and a refrigerant flow controller for selectively supplying refrigerant to at least one of the refrigerant coolers, and the method further comprises an air-conditioning mode comprising selectively supplying refrigerant to only said second refrigerant cooler and selectively returning coolant from the cooler to the evaporator.

* * * * *